US007406706B1

(12) United States Patent
Kou (10) Patent No.: US 7,406,706 B1
(45) Date of Patent: Jul. 29, 2008

(54) METHOD AND SYSTEM FOR DEVICES EFFICIENTLY SHARING INFORMATION REGARDING THE CONTENT OF A DIGITAL TELEVISION BIT-STREAM

(75) Inventor: Sho Kou, Saratoga, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 567 days.

(21) Appl. No.: 09/596,853

(22) Filed: Jun. 19, 2000

Related U.S. Application Data

(60) Provisional application No. 60/146,071, filed on Jul. 28, 1999.

(51) Int. Cl.
*H04N 7/173* (2006.01)
(52) U.S. Cl. .............. 725/132; 725/131; 725/151; 725/152
(58) Field of Classification Search .......... 725/37–38, 725/39, 80, 133, 141, 153, 54, 131, 132, 725/151, 152; 348/469, 461, 468, 726, 731; 707/100, 102, 104.1, 200, 205
See application file for complete search history.

(56) References Cited

U.S. PATENT DOCUMENTS

| 5,600,378 | A | * | 2/1997 | Wasilewski | 348/468 |
| 5,619,274 | A | * | 4/1997 | Roop et al. | 348/461 |
| 5,841,433 | A | * | 11/1998 | Chaney | 725/50 |
| 5,850,218 | A | * | 12/1998 | LaJoie et al. | 725/45 |
| 6,115,074 | A | * | 9/2000 | Ozkan et al. | 348/465 |
| 6,460,030 | B1 | * | 10/2002 | Ludtke | 707/3 |
| 6,505,347 | B1 | * | 1/2003 | Kaneko et al. | 725/39 |
| 6,529,526 | B1 | * | 3/2003 | Schneidewend | 370/486 |
| 6,546,419 | B1 | * | 4/2003 | Humpleman et al. | 709/223 |
| 6,714,722 | B1 | * | 3/2004 | Tsukidate | 386/83 |
| 2003/0167473 | A1 | * | 9/2003 | Klosterman et al. | 725/140 |

OTHER PUBLICATIONS

"Program and System Information Protocol for Terrestrial Broadcast and Cable"; Advanced Television Systems Committee; Doc. A/65; Dec. 23, 1997; 93 pages.

* cited by examiner

*Primary Examiner*—Ngoc K Vu (57) ABSTRACT

A method and system for efficiently allowing a controller device to receive information from a tuner device regarding the content of a digital television bit-stream. The present invention first receives a digital television bit-stream at a tuner device. The digital television bit-stream comprises video, audio, and data information, as well as tables that describe the content of the bit-stream. Next, to obtain a table, a controller device sets a value specifying a desired table in an attribute field of a command. Next, the controller sets at least one flag in a flag field of the command. The setting of the flag indicates the table which is being requested. Additionally, because a single attribute field may hold different types of information, the flags indicate which type of information is in the attribute field for this issuance of the command. The controller, then issues the command to the tuner, which determines what table is being requested, based upon the flags set. The tuner then returns that table to the controller.

11 Claims, 7 Drawing Sheets

200

| ADDRESS OFFSET | MSB | | | | | | | LSB |
|---|---|---|---|---|---|---|---|---|

FLAG FIELD 251

| $01_{16}$ | TABLE_ID | 262 |
|---|---|---|
| $02_{16}$ | SOURCE_ID (MSB) | 264 |
| $03_{16}$ | SOURCE_ID (LSB) | 265 |
| $04_{16}$ | RATING_REGION (MSB) | 266 |
| $05_{16}$ | RATING_REGION (LSB) | 267 |
| $06_{16}$ | ETM_ID (MSB) | 268 |
| $07_{16}$ | ETM_ID (SECOND MSB) | 269 |
| $08_{16}$ | ETM_ID (THIRD MSB) | 270 |
| $09_{16}$ | ETM_ID (LSB) | 271 |

ATTRIBUTE FIELDS 260

FLAG FIELD 501

| $01_{16}$ | TABLE_ID | 521 |
| --- | --- | --- |
| $02_{16}$ | SOURCE_ID (MSB), OR RATING_REGION (MSB), OR ETM_ID (MSB) | 522 |
| $03_{16}$ | SOURCE_ID (LSB), OR RATING_REGION (LSB), OR ETM_ID (SECOND MSB) | 523 |
| $04_{16}$ | ETM_ID (THIRD MSB) | 524 |
| $05_{16}$ | ETM_ID (LSB) | 525 |

ATTRIBUTE FIELDS 511

METHOD AND SYSTEM FOR DEVICES EFFICIENTLY SHARING INFORMATION REGARDING THE CONTENT OF A DIGITAL TELEVISION BIT-STREAM

RELATED U.S. APPLICATION

This application is related to U.S. Provisional Application entitled, "Selection Specifier Valid Flags And Selection Specifier Attributes Fields Assignments For AV/C Tuner Broadcast System-ATSC Digital Television," Application No. 60/146,071, filed on Jul. 28, 1999. Said provisional application is hereby incorporated by reference.

FIELD OF THE INVENTION

The present invention relates to the field of digital television. Specifically, the present invention relates to a system and method for efficiently allowing a controller device to receive information from a tuner device regarding the content of a digital television bit-stream.

BACKGROUND ART

The process of transmitting digital television signals, whether terrestrially or over cable, involves digitizing, compressing, and multiplexing video and audio signals into a single bit-stream before transmitting them. The bandwidth in a typical terrestrial broadcast is wide enough to transmit a number of compressed digitized television channels over the same bit-stream. Additionally, data such as, weather reports, stock prices, news, pay-per-view information, and classified advertisements may be multiplexed into the bit-stream.

Because the bit-stream contains a variety of information, there must be a way for the receiving end to know the content of the bit-stream. Therefore, Program and System Information Protocol (PSIP) tables are multiplexed into the bit-stream to describe both system information and event information of the signal within the bit-stream. System information allows navigation and access to each of the television channels within the bit-stream. Event (or program guide) information describes content information for browsing and selection. The Program and System Information Protocol (PSIP) describes a protocol for transmission of a collection of such data tables within the bit-stream. (See, e.g., the specification entitled, "Program and System Information Protocol for Terrestrial Broadcast and Cable", Advanced Television System Committee, Document A65, Dec. 23, 1997).

Some examples of the tables are the System Time Table (STT) which carries time information needed for an application requiring synchronization. The Master Guide Table (MGT) lists version numbers, length in bytes, and Packet Identifiers (PIDs) for all of the PSIP tables except the System Time Table. The Virtual Channel Table (VCT) contains a list of attributes for all channels carried in the bit-stream. This table has a terrestrial version (TVCT) and a cable version (CVCT). The Rating Region Table (RRT) carries rating information, e.g., G, PG, R, etc. for various geographic regions. The Event Information Table (EIT) contains information regarding events on channels in the bit-stream, such as titles and start times. The Extended Text Table (ETT) contains detailed information about channels and events in the bit-stream.

When one device in a digital television receiving system needs information about the bit-stream from another device, it issues a Direct Select Data (DSD) command. This command is part of the AV/C (Audio Video Control) Tuner Model and Command Set Specification and allows event and navigational information provided by the service providers to be understood. The information includes the tables discussed above.

Figure 1:
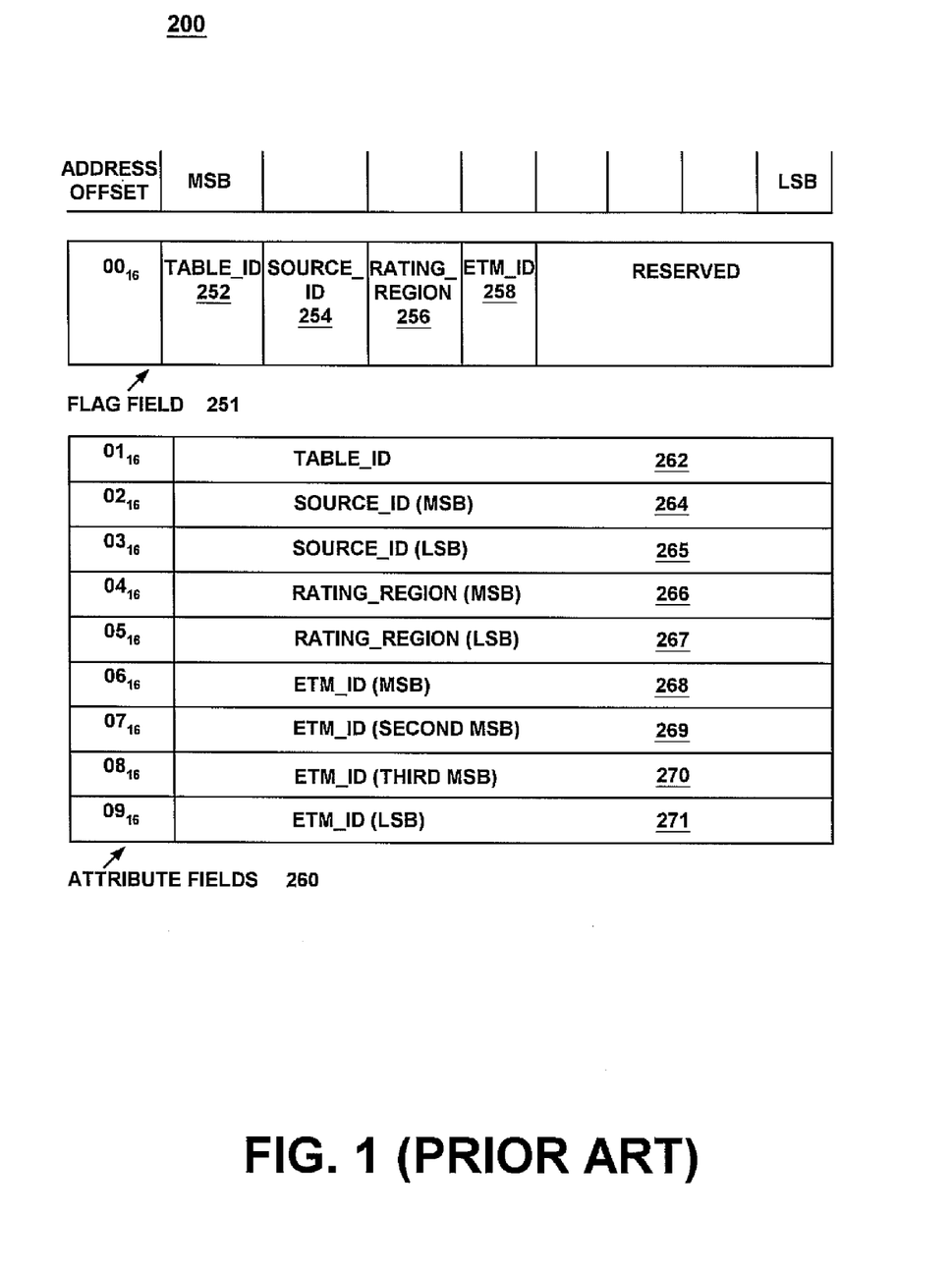
FIG. 1 is an illustration of a Direct Select Data command which is issued from a controller device to a tuner device to request information about a bit-stream of digitized television data, according to conventional techniques.

In particular, the DSD command has a dsd_selection_specification[n] field, which is used to specify which table is to be accessed. FIG. 1 illustrates a dsd_selection specification [n] field 200. The byte at offset 00 comprises flags 251. When a flag 251 is set, the value in the associated attribute field 260, is valid. For example, when the table_id flag 252 is set, the associated table_id attribute field 262 contains a valid table_id. If the table_id flag 252 is not set, then whatever value that may be in the table_id attribute field 262 is invalid, but a space is nevertheless reserved for it. The same applies to the flags 254-258 and their respective associated attribute fields 264-271.

For the issuing device to request the MGT, TVCT, CVCT, or STT table, the table_id flag 252 is set and the table_id is specified in the table_id attribute field 262. Selecting the Rating Regions table is accomplished by setting the table_id flag 252 and rating region 256 flag, as well as specifying the table_id 262 and the rating_region 267. Selecting the Event Information Table is accomplished by setting the table_id flag 252 and source_id flag 254, as well as specifying the table_id attribute 262 and the source_id attributes 264-265. Selecting the Extended Text Table is accomplished by setting the table_id flag 252 and ETM_id flag 258, as well as specifying the table_id attribute 262 and the ETM_id attributes 268-271.

The issuer of the DSD command requests just one table at a time. Therefore, a separate command 200 must be issued for each table. Unfortunately, many bytes in the DSD command data structure are not used. For example, when the issuer requests an event information table, attribute fields 266-271 are not used at all. Therefore, the command structure 200 is inefficient, and many of these command structures are issued during the normal course of system activity. Consequently, memory space on the devices is wasted. Additionally, bandwidth is wasted transmitting a command 200 with bytes that have no meaning or use.

SUMMARY OF THE INVENTION

Therefore, it would be advantageous, then, to provide a method and system for efficiently allowing a controller device to receive information from a tuner device regarding the content of a digital television bit-stream. What is further needed is a method and system which does not require substantial memory space in the devices. What is even further needed is a method and system which takes a minimum of bandwidth to transfer the information between the devices.

The present invention provides a method and system for efficiently allowing a controller device to receive information from a tuner device regarding the content of a digital television bit-stream. The present invention does so with an efficient command structure which does not waste memory space in the devices. Furthermore, the present invention provides for a method and system which uses bandwidth efficiently. Further still, the present invention is compatible with existing standards. The present invention provides these advantages and others not specifically mentioned above but described in the sections to follow.

A method and system for efficiently allowing a controller device to receive information from a tuner device regarding the content of a digital television bit-stream is disclosed. The present invention first receives a digital television bit-stream at a tuner device. The digital television bit-stream comprises video, audio, and data information, as well as tables that describe the content of the bit-stream. Next, to obtain a table, a controller device sets a value specifying a desired table in an attribute field of a command. Next, the controller sets at least one flag in a flag field of the command. The setting of the flag indicates the table which is being requested. Additionally, because a single attribute field may hold different types of information, the flags indicate which type of information is in the attribute field for this issuance of the command. The controller, then issues the command to the tuner, which determines what table is being requested, based upon the flags set. The tuner then returns that table to the controller. Using the present invention, the command data structure only reserves space for valid data and does not require the allocation of data space for invalid data, thereby making the present invention more efficient over the prior art.

DETAILED DESCRIPTION OF THE INVENTION

In the following detailed description of the present invention, a system and method for efficiently allowing a controller device to receive information from a tuner device regarding the content of a digital television bit-stream, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Devices Efficiently Sharing Information Regarding the Content of a Digital Television Bit-Stream The present invention provides for a method and system for efficiently allowing a controller device to send requests to and receive information from a tuner device regarding the content of a digital television bit-stream in a network of audio/video components. The present invention uses the valid flags from a direct select data (DSD) command structure from the AV/C Tuner Model and Command Set Specification to not only indicate that an attribute field of the command is valid, but to also specify what type of information is being represented in the attribute fields. In this fashion, a single attribute field may be used to represent different types of information, depending on how the flags are configured. This provides for an efficient DSD command structure because data spaces do not have to be allocated for unused or invalid data.

Figure 2:
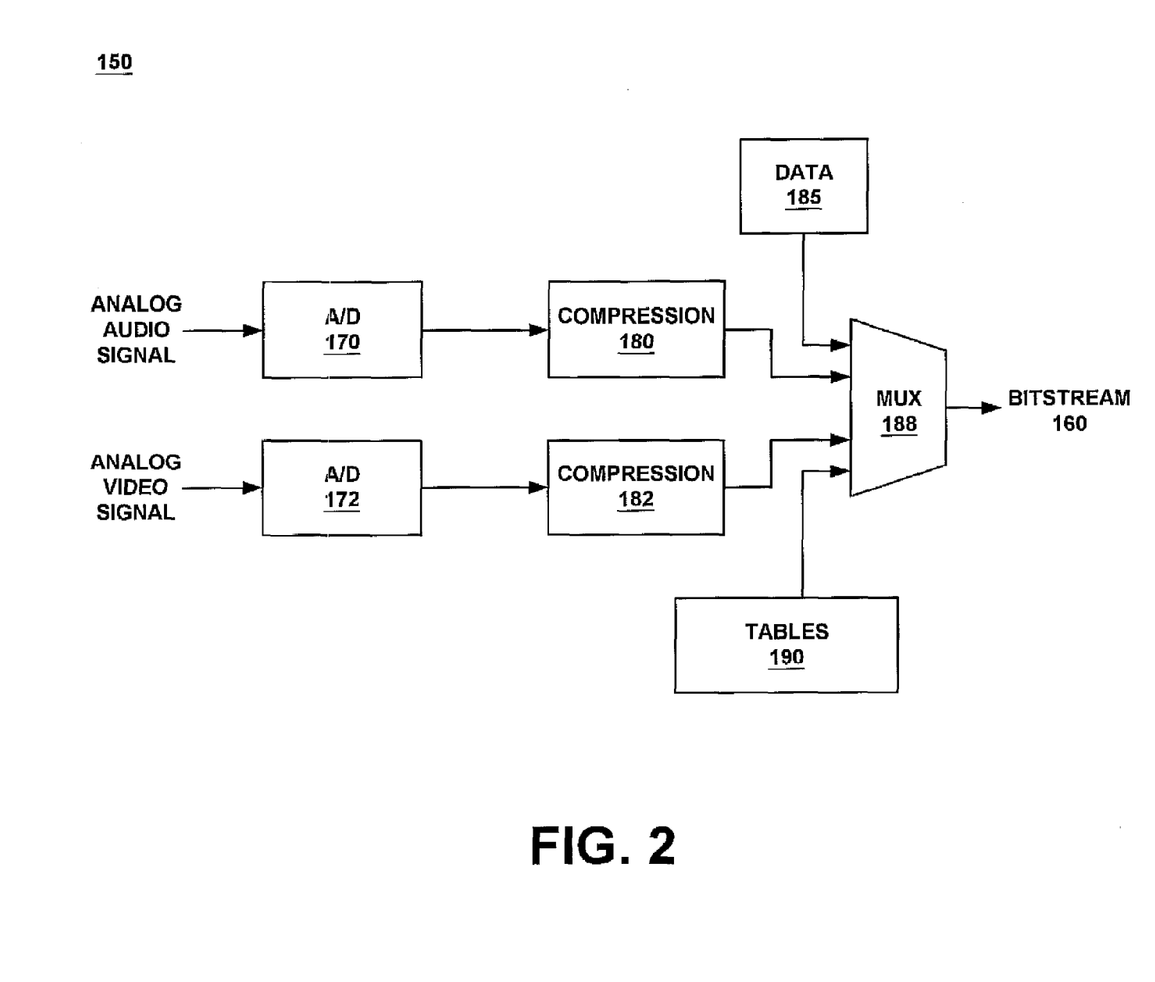
FIG. 2 is an illustration of the components used to form a bit-stream of digitized television information, which is an input to an embodiment of the present invention.

FIG. 2 illustrates a system 150 for producing a bit-stream 160 of multiplexed digital television information. System 150 inputs analog audio and video signals, which are digitized by A/D converters 170 and 172. Therefore, multiple television channels may exist in a single bit-stream. Next, the signals are compressed at compression stages 180 and 182. The compressed signals are input to multiplexer 188, along with data 185 to produce a single bit-stream 160. Furthermore, tables 190 are multiplexed into the bit-stream 160 to provide information regarding the content of the bit-stream 160 itself. These tables 190 may be PSIP tables containing information about the content of the bit-stream, although it will be understood that the present invention is well-suited to operate with tables 190 in the bit-stream 160 in other formats, as well.

Figure 3:
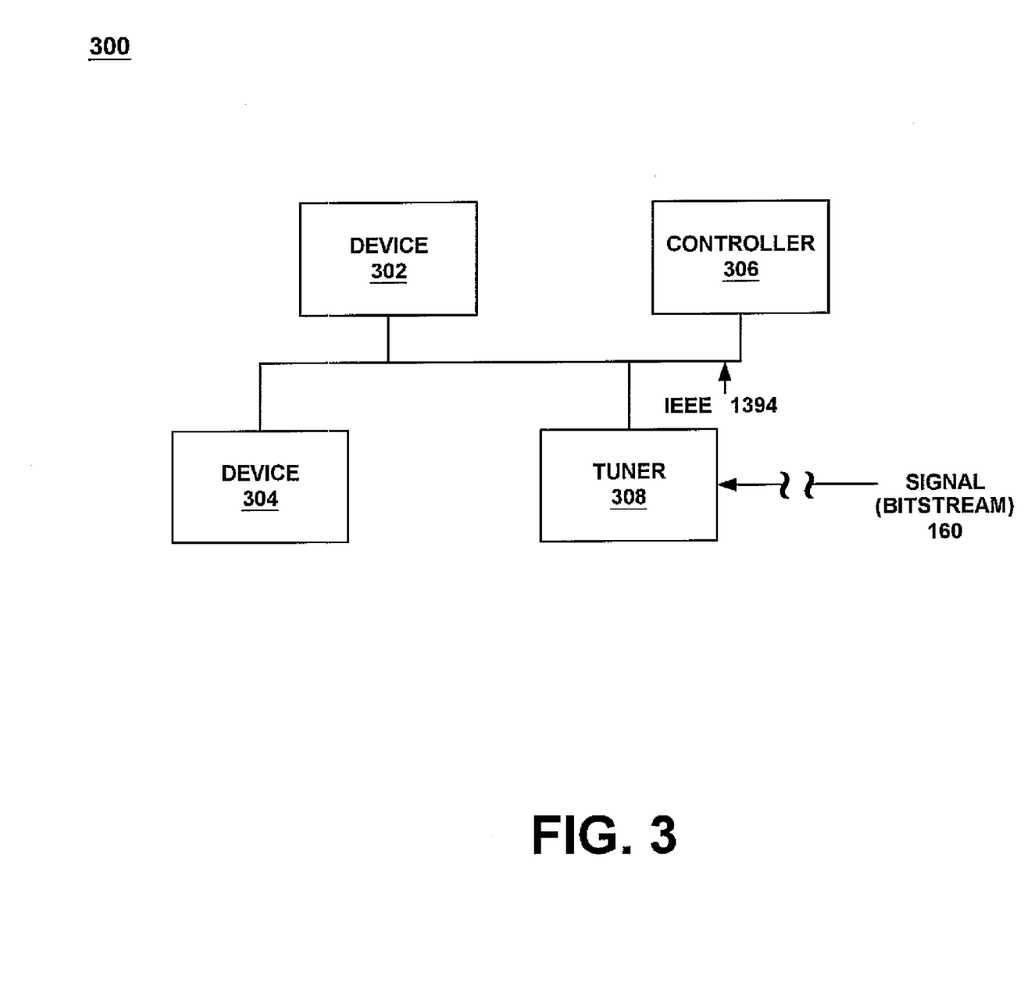
FIG. 3 is an illustration of an audio-visual network, in which an embodiment of the present invention may be practiced.

FIG. 3 illustrates an audio-visual network 300, in which the present invention may be practiced, having a number of devices (302-308) connected by a IEEE 1394 serial bus, which serves as a communication link. Example devices are television set-top boxes, camcorders, VCRs, and the like. One of the devices, for example, a set-top box, acts as a controller 306 and issues commands when the controller 306 needs event or system information regarding the bit-stream 160. The target device (e.g., a tuner 308) executes the command and returns the requested information, for example, a table 190 to the controller 306. The tuner 308 may be any device capable of receiving the digital bit-stream 160. The present invention is well-suited to operate with other bus types and device types. Furthermore, it is not required that a controller device 306 issue the command and that a tuner device 308 receive the command. For example, other devices may send and/or receive the command.

Figure 4:
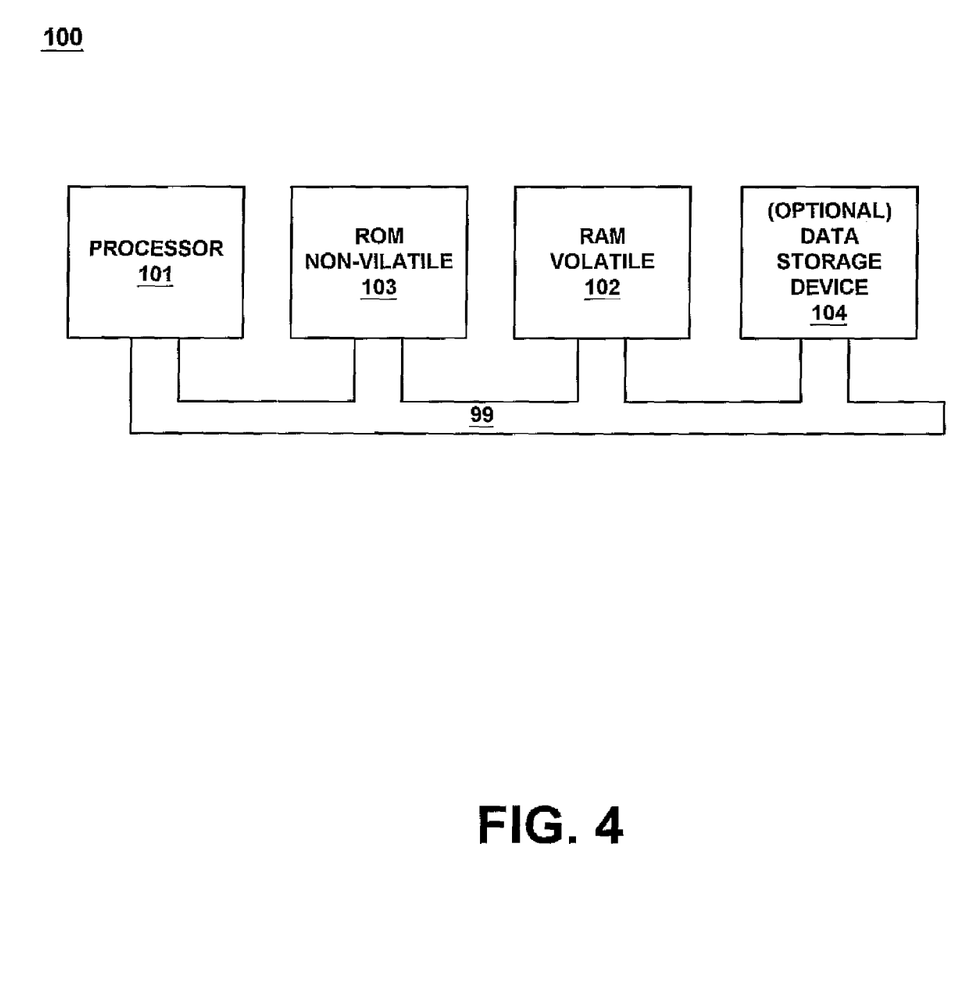
FIG. 4 is a schematic of a computer system, which may be useful to implement an embodiment of the present invention.

FIG. 4 illustrates circuitry of computer system 100, which may form a platform upon which to perform an embodiment of the present invention in one or more of the devices. Namely, any of the devices in FIG. 3 may include computer system 100. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

Figure 5:
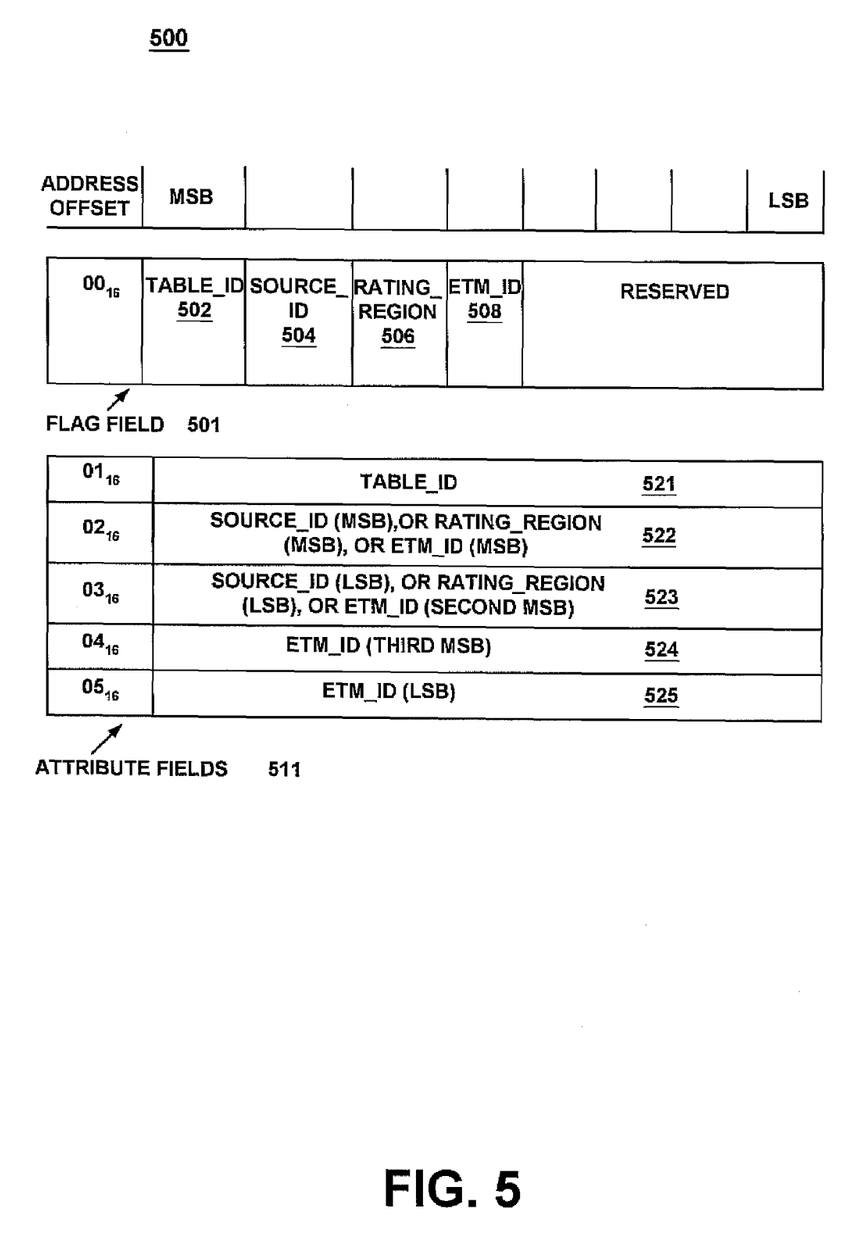
FIG. 5 is an illustration of a compact Direct Select Data command which is issued from a controller device to a tuner device to request information about a bit-stream of digitized television data, according to an embodiment of the present invention.

FIG. 5 illustrates a command structure 500 that the controller device 306 may issue to the tuner device 308 in one embodiment of the present invention. Command 500 is realized in computer readable memory and can be broadcast as a digitized message or "packet" from one device to another. The controller 306 issues this command 500 when information regarding the content of the bit-stream 160 is needed. The command 500 is comprised of a flag field 501 comprising the flags: table_id 502, source_id 504, rating_region 506, and ETM_id (Extended Text Message) 508. In one embodiment of the invention, flags 504-508 are mutually exclusive. However, flag 502 may be set with any other flag. The present invention is suited to using other types of flags or additional flags in the flag field 501. Also, the order of flags may be altered, if desired. The settings of these flags defines which tables 190 the command issuer (e.g., controller 306) wishes the command receiver (e.g., tuner 308) to send back.

Command 500 in FIG. 5 also comprises attribute fields 511, which contain information regarding the type of information which the issuer of the command 500 seeks. In one embodiment, the type of information comprises system information such as, the SST, MGT, TVCT, and CVCT tables, and event information, such as the RRT, EIT, and ETT tables. In particular, attribute field 521 is the table_id attribute field. Attribute field 522 may contain three different types of information. First, the most significant byte (MSB) of the source_id attribute field, second the MSB of the rating region attribute field, and third the MSB of the ETM_id attribute field. By using a single attribute field 522 to represent three different types of information (one at a time), this embodiment of the present invention saves memory space in the devices and reduces the size of the command 500 to be transferred between devices. Also, the command 500 does not need to reserve data space for invalid data.

In a similar fashion, attribute field 523 may comprise three different types of information. First, the least significant byte (LSB) of the source_id attribute field, second, the LSB of the rating region attribute field, and third, the second MSB of the ETM_id attribute field. Attribute fields 524 and 525 comprise, respectively, the third MSB and LSB of the ETM_id attribute field. It will be appreciated that the order of the attribute fields 511 and which attributes are assigned to a given field is not critical to gaining efficiency. Hence, the present invention is well-suited to other arrangements of attributes fields 511 in the command 500.

The issuer of the command 500 selects the desired table as follows. To select the MGT, the TVCT, the CVCT, or the STT, the table_id flag 502 is set by the command issuer. Additionally, the appropriate value is specified in the table_id attribute field 521. To select the Rating Region Table, the table_id flag 502 is set along with the rating region flag 506. Additionally, the appropriate values are set in attribute fields 522 and 523.

To select the Event Information Table, the table_id flag 502 and the source_id 504 flag are set. Additionally, the appropriate value is set in attribute fields 522-523. To select the extended Text Table, the table_id flag 502 and the ETM id flag 508 are set. Additionally, the appropriate values are specified in attribute fields 522-525.

Figure 6:
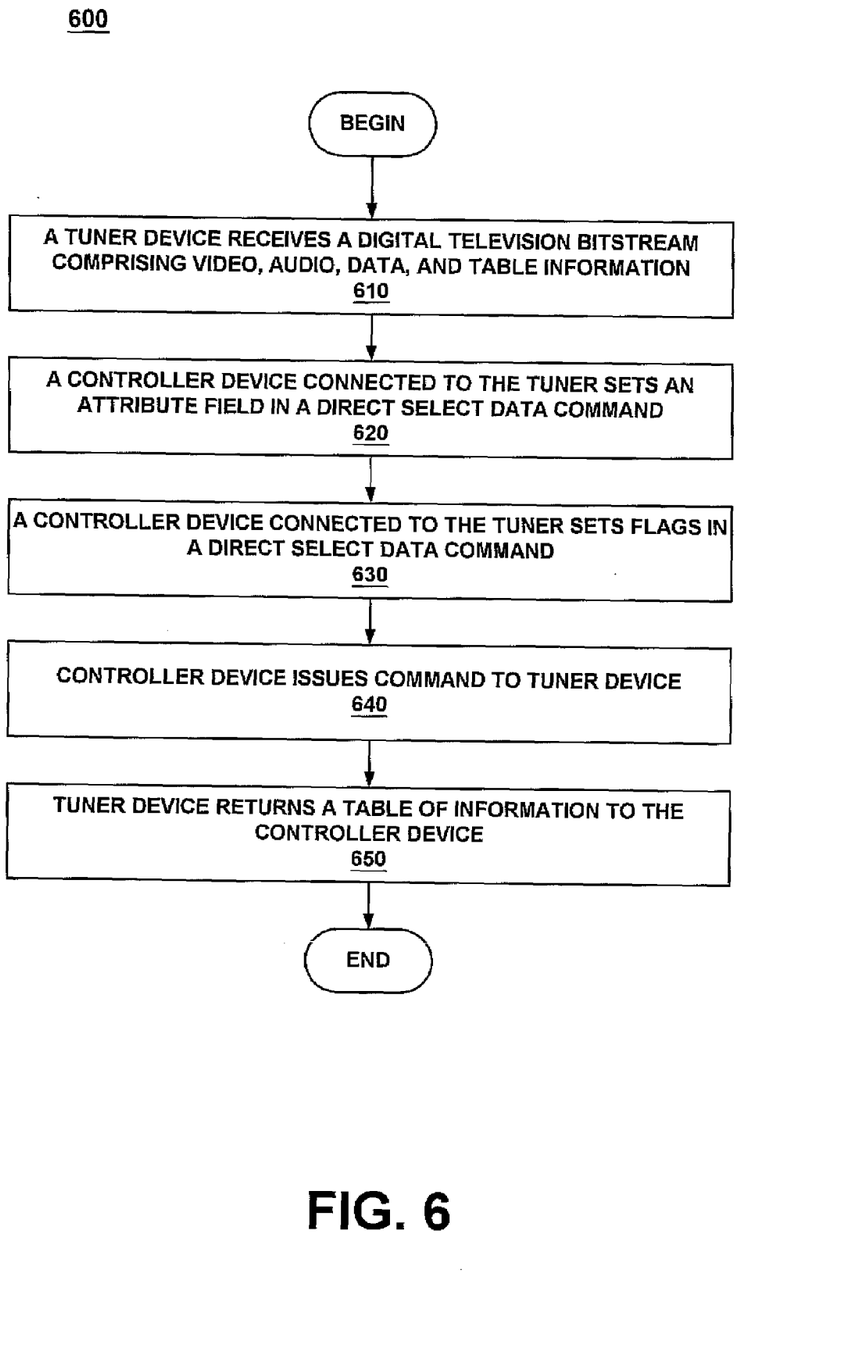
FIG. 6 is a flowchart illustrating the steps of a controller device requesting and receiving information regarding a bit-stream of television information, according to an embodiment of the present invention.

FIG. 6 illustrates a flowchart of the steps of a process 600 of a controller 306 requesting and receiving information regarding a bit-stream 160 from tuner 308. At step 610, tuner 308 receives a bit-stream 160 of digitized television information. This signal comprises digitized video, digitized audio, as well as data information. The digitized signal may be in MPEG format, although the present invention is not limited to signals using this format. The data information may include data such as Weather reports, stock prices, etc. Additionally, tables which describe the content of the bit-stream 160 itself may be a part of the bit-stream. One format for these tables is described in a standard entitled "Program and System Information Protocol for Terrestrial Broadcast and Cable," Advanced Television System Committee, Document A65, Dec. 23, 1997. However, the present invention is well-suited to operate on bit-streams with tables of other formats.

In step 620 of this embodiment of the present invention a controller 306 sets a value in an attribute field 511 in a command 500 for requesting information about the content of the bit-stream 160. The command 500 may be a direct select data (DSD) command, which is described in the AV/C Tuner Model and Command Set Specification. The information requested may be a table 190, such as described herein. Each table 190 has its own attributes to avoid confusion when selecting the tables 190.

In step 630, the controller 306 sets flags in the command flag field 501 to specify which table 190 is desired. These flags also describe what type of information is being represented in the attribute field 511. For example, if the rating region flag 506 is set, then the value in the attribute fields 522-523 represent a rating region table. In this case, attribute fields 522-523 do not represent source_id or ETM_id table information. (As these fields can if other flags are selected.) Thus, an attribute field 511 may refer to different types of data, depending on the flags 501 which are set. However, no confusion will exist over the type of information which is being represented in an attribute field 511 for a given command 500.

In step 640, the controller 306 issues the command 500 to the tuner 308. In step 650, the tuner 308 executes the command and returns the requested table 190 to the controller 306.

Figure 7:
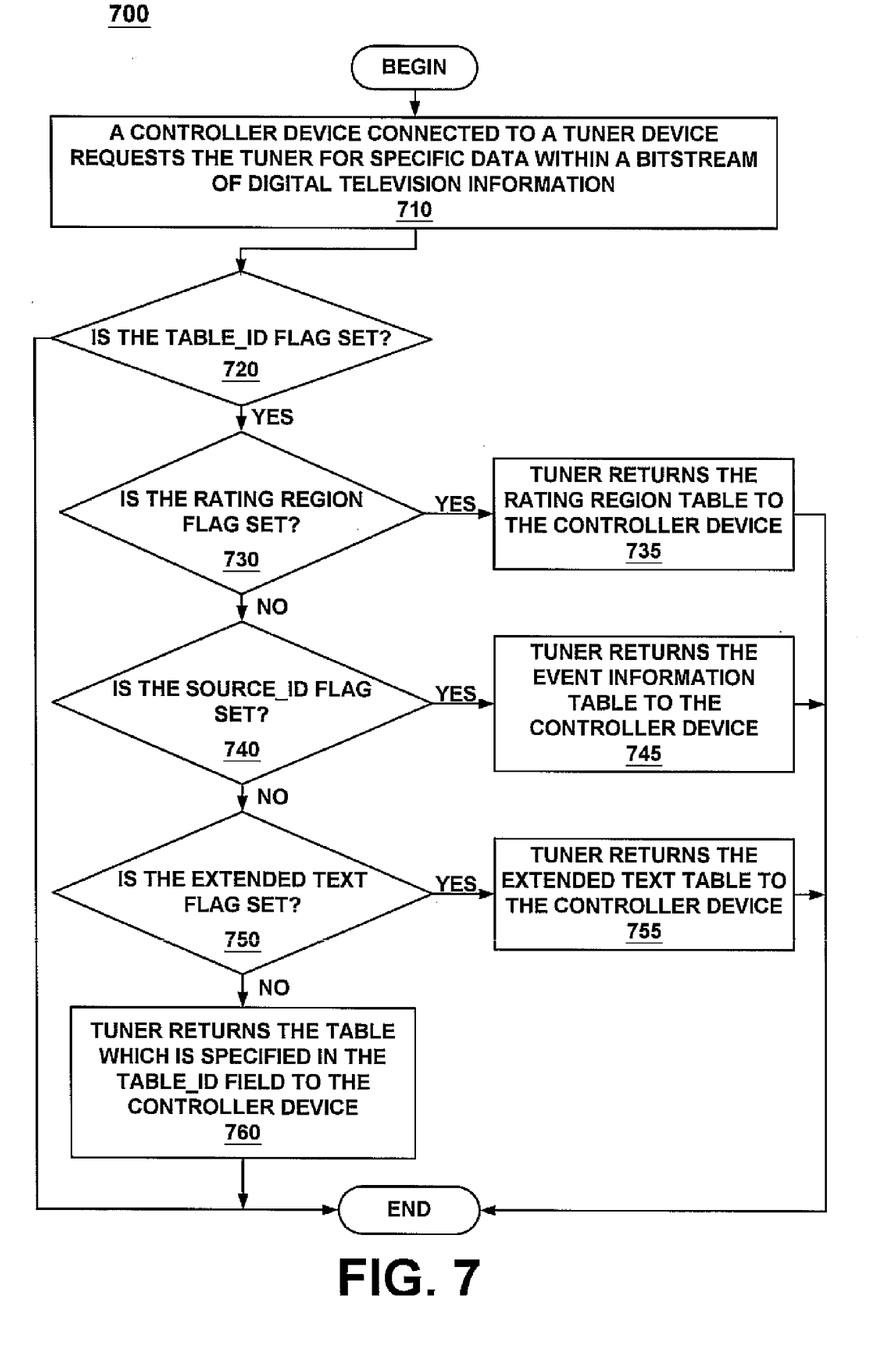
FIG. 7 is a flowchart illustrating the steps of a tuner device determining the type of information to send to the controller, according to an embodiment of the present invention.

FIG. 7 illustrates a flowchart of a process 700 of the tuner 308 determining what table 190 from the bit-stream 160 to return to the controller 308. In step 710, the controller 306 issues a command 500 to the tuner 308. In step 720, the tuner 308 checks to see if the table_id flag 502 is set. As this embodiment of the present invention requires this flag to be set for all requests, the tuner 308 will not return any table 190 if this flag 502 is not set. If it is set then, at step 730, the tuner 308 checks to see if the rating region flag 506 is also set. If so, the tuner 308 references, in step 735, the values in attribute fields 522-523. These values are used to send back rating region table information to the controller 306. As only one table 190 may be returned per command 500, the process then goes to the end step.

If the rating region table flag 506 was not set, then at step 740, the tuner 308 checks the source id flag 504. If it is set, then the very same attribute fields (522 and 523) used in step 735 for rating region attributes are now used, in step 745 for event table attributes. The tuner references these attribute fields 522-523 and returns an event table 190 to the controller 306. This concludes command processing as only one table 190 may be returned per command 500.

If the source id flag 504 was not set, then the tuner 308 checks for the ETM_id flag 508. If it is set, then the tuner 308 references attribute fields 522-525. Using that information, the tuner 308 returns an ETM table 190 to the controller 306. Because the ETM attribute field overlaps with other attribute fields in the command structure, the command is compact and hence efficient. Again, the process ends here after the table 190 is returned to the controller 306.

If the ETM_id flag 508 was not set, then the tuner 308 refers to the table id attribute field 521 to determine whether tables 190, such as MGT, TVCT, CVCT, or STT are to be returned. It will be borne in mind that the order of checking the flags 501 is not critical and that other flags 501 and attribute fields 511 may also be used.

The preferred embodiment of the present invention a method and system for efficiently allowing a controller device to receive information from a tuner device regarding the content of a digital television bit-stream, is thus described. While the present invention has been described in particular embodiments, it should be appreciated that the present invention should not be construed as limited by such embodiments, but rather construed according to the below claims.

I claim:

1. An electronic system comprising:
   a first device for accessing a multimedia bit stream;
   a second device coupled to said first device and for generating a command requesting a table describing information in said multimedia bit stream, said command comprising:
      a plurality of attribute fields comprising:
         a table field for specifying a table identifier; and
         a multi-purpose field for specifying a select attribute related to a requested table, said select attribute selected from among a plurality of possible attributes; and
         a flag field for identifying said select attribute from said plurality of possible attributes held by said multi-purpose field; and
   in response to receiving said command, wherein said first device is operable to:
      determine if said flag field indicates a rating region table is requested, and if so, use ratings information in said multi-purpose field to provide said rating region table;
      determine if said flag field indicates an event information table is requested, and if so, use event information in said multi-purpose field to provide said event information table; and
      determine if said flag field indicates an extended text table is requested, and if so, use extended text information in said multi-purpose field to provide said extended text table.

2. The electronic system of claim 1, wherein said first device comprises a tuner for receiving and decoding a digital television signal.

3. The electronic system of claim 1, wherein said second device comprises a controller for issuing commands to said first device and processing information received from said first device.

4. The electronic system of claim 1, wherein said second device is operable to set a flag indicating said table field is valid.

5. The electronic system of claim 4, wherein said second device is further operable to set a value in said table field.

6. The electronic system of claim 1, wherein said first device is further operable to provide a table identified by said table identifier in said table field if said flag field indicates a table identification is requested.

7. The electronic system of claim 1, wherein said second device is further operable to set said flag field to specify which one of the plurality of attributes said multi-purpose field holds.

8. The electronic system of claim 1, wherein said command is a direct select data command.

9. The electronic system of claim 1, wherein said multi-purpose field is for specifying an attribute for one of a rating region table, an event information table, and an extended text table.

10. The electronic system of claim 1, wherein said table identifier is operable to specify at least one of a master guide table, a terrestrial virtual channel table, a cable virtual channel table, a system time table, a rating region table, an event information table, and an extended text table.

11. The electronic system of claim 1, wherein said plurality of attribute fields relate to at least one of programming information, rating information related to at least one geographic region, and an extended text message related to said bit stream.

* * * * *